Dec. 31, 1963  H. MULCH  3,115,811
SWITCHING MEANS IN A SLIDE PROJECTOR
Filed Dec. 27, 1960  4 Sheets-Sheet 1
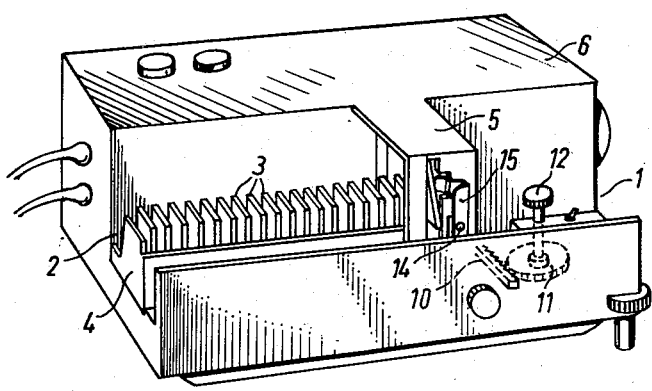
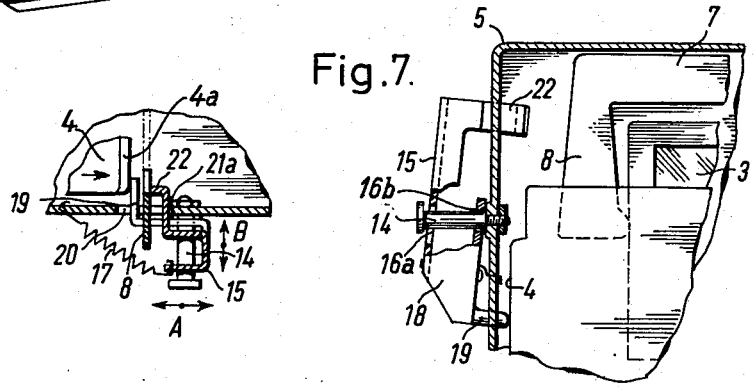
INVENTOR:
HANS MULCH
By Toulmin & Toulmin
Attorneys Dec. 31, 1963  H. MULCH  3,115,811
SWITCHING MEANS IN A SLIDE PROJECTOR
Filed Dec. 27, 1960  4 Sheets-Sheet 2
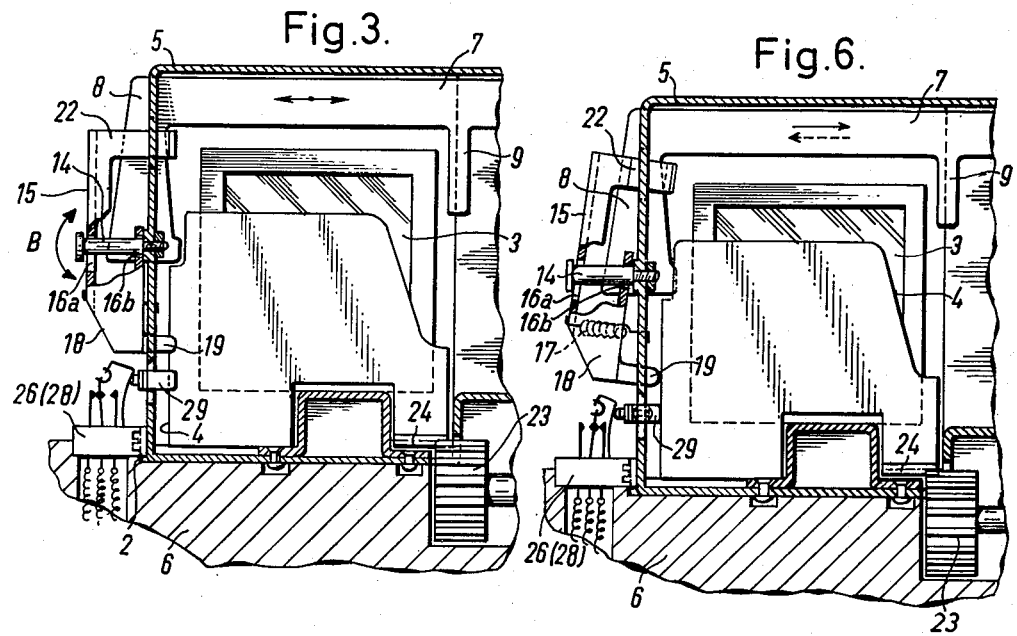
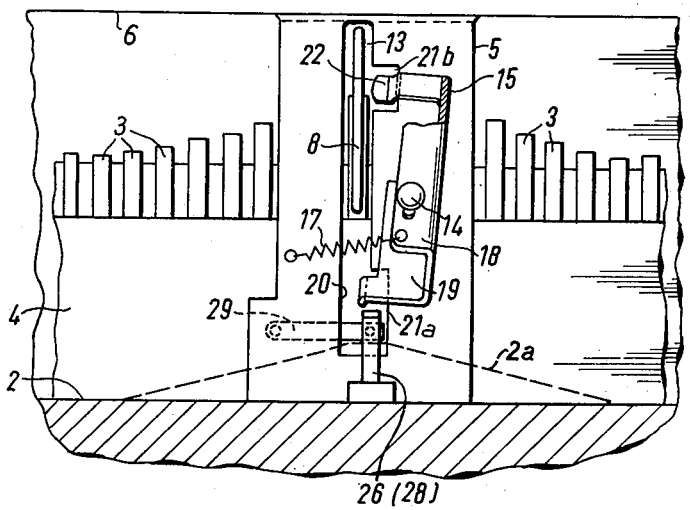
INVENTOR:
HANS MULCH
By Toulmin & Toulmin
Attorneys Dec. 31, 1963   H. MULCH   3,115,811
SWITCHING MEANS IN A SLIDE PROJECTOR
Filed Dec. 27, 1960   4 Sheets-Sheet 4

INVENTOR:
HANS MULCH

By Toulmin & Toulmin

Attorneys

United States Patent Office 3,115,811
Patented Dec. 31, 1963

3,115,811
SWITCHING MEANS IN A SLIDE PROJECTOR
Hans Mulch, Wetzlar (Lahn), Germany, assignor to Ernst Leitz, Gesellschaft mit beschrankter Haftung, Wetzlar (Lahn), Germany
Filed Dec. 27, 1960, Ser. No. 91,293
Claims priority, application Germany Dec. 28, 1959
2 Claims. (Cl. 88—28)

The present invention relates to an improvement in a slide projector, more particularly, to a projector for positioning a slide magazine so that the initial slide therein may be transferred by the slide changing mechanism into the projecting position.

In the conventional slide projector the magazine is inserted onto the guideway by hand and then manually pushed into position wherein the first slide is in cooperating relationship with the slide changing mechanism. In the usual structure of a slide projector the guideway is concealed by portions of the casing in the area of the slide changing mechanism. Further, in most instances the slide magazine is inserted in a darkened room and, consequently, the movement of the magazine cannot be seen by the operator of the projector. Therefore it is difficult to position the slide magazine in that position wherein the first slide can be actuated by the slide changing mechanism. It is therefore necessary to ascertain this position of the slide magazine by trial and error.

One possible indication for ascertaining the position of the slide magazine can be obtained when the rack on the magazine engages the gearing for moving the slide magazine. If the magazine is carefully introduced the operator can feel that the rack and the gear begin to mesh. This, however, is not an accurate position indicator since in most cases the gearing is of the noiseless type and offers very little resistance to the continued sliding movement of the slide magazine when it is manually introduced.

The use of a stop which is interconnected with the mechanism for moving the slide is not possible since in most cases this stop must be disconnected when it is desired to introduce a slide magazine into the projector.

The present invention is directed to a slide projector arrangement for eliminating the above disadvantages so that the slide magazine can be accurately positioned in the guideway wherein the first slide can be engaged by the slide changing mechanism. The invention essentially comprises a locking device which stops the sliding movement of the magazine when it is introduced which is automatically disconnected when the slide changing mechanism operates so as to enable the slide magazine to be moved along the guideway to position succeeding slides in working relationship to the slide changing mechanism. The locking member engages and disengages the slide magazine as a function of both the slide magazine and the slide changing mechanism.

The locking member comprises a spring-biassed pivotally mounted lever which is movable about a horizontal axis in two vertical planes with respect to each other. This lever has a locking portion and a control arm with the pivoting movement of the lever being limited by stops which cooperate with the locking portion and the control arm. The locking portion engages the forward surface of the magazine when it is introduced and accordingly the lever is pivoted throughout its limited movement whereby the control arm effectively engages the slide changing mechanism. The slide changing mechanism must be first placed in position so as to be able to receive the slide magazine. In the usual slide projector the slide magazine can be positioned manually since an operating knob is generally provided for this purpose. In addition, switching circuits can be provided which de-energize the motor circuit after the last slide has been returned to the magazine from the projecting position. Also, a circuit can be provided wherein the slide changer automatically stops in the position opposite to its projecting position so that the slide changing mechanism can receive the slide magazine.

In the present invention the switching circuit comprises a movable contact which is maintained in its connected position by the slide magazine. This slide magazine passes along the guideway. When the magazine passes this movable contact after the last slide has been returned to the magazine, the contact arm will return to its normal position and thereby opens the motor circuit. In this normal position the contact arm may be readily engaged by the next succeeding magazine, thereby to again close the motor circuit. This eliminates the manual step by the operation of starting the first slide into its projecting position. This contact arm is so located with respect to the locking member that the contact arm will close the energized motor circuit only when the magazine is introduced as far as possible to abut against the stop on the locking member.

In the present invention the locking portion and the control arm are so constructed that during a short movement of the slide changing mechanism during which the locking portion is uncoupled, the control arm is disengaged from the slide changing mechanism. As a result, the lever is pivoted about its axis under urging of the spring in such a manner that the locking member will engage the side wall of the magazine while the magazine is being moved along the guideway. The locking member is so arranged that after passage of the slide magazine the locking portion will be rotated by the spring to again project into the guideway so as to be in the path of the next succeeding slide magazine.

It is therefore the principal object of this invention to provide a novel and improved slide projector.

It is a further object of this invention to provide an arrangement for a slide projector wherein the correct position of the first slide is automatically obtained when the slide magazine is introduced into the slide projector.

Other objects and advantages of this invention will be apparent upon reference to the accompanying description when taken in conjunction with the following drawings, wherein FIGURE 1 is an overall perspective view of the slide projector of this invention illustrating both the slide magazine inserted in the guideway and the locking lever for engaging the magazine;

FIGURE 2 is a side elevational view in enlarged scale of the locking lever portion of the slide projector;

FIGURE 3 is a front elevational view showing the slide magazine within the guideway;

FIGURE 4 is a top plan view of a portion of the slide projector and illustrating the locking lever;

FIGURE 5 is a side elevational view similar to that of FIGURE 2 but showing the locking lever in its unlocked position;

FIGURE 6 is a front elevational view similar to that of FIGURE 3 but showing the locking lever in unlocking position but with the control arm in engagement with the slide changing mechanism;

FIGURE 7 is a front elevational view of a portion of the slide changer as shown in FIGURE 6 but showing the locking lever after the control arm has been disengaged from the slide changing mechanism;

Proceeding now to a description of a specific embodiment of the present invention reference is made to the accompanying drawings wherein like reference symbols indicate the same parts throughout the various views.

Figure 8:
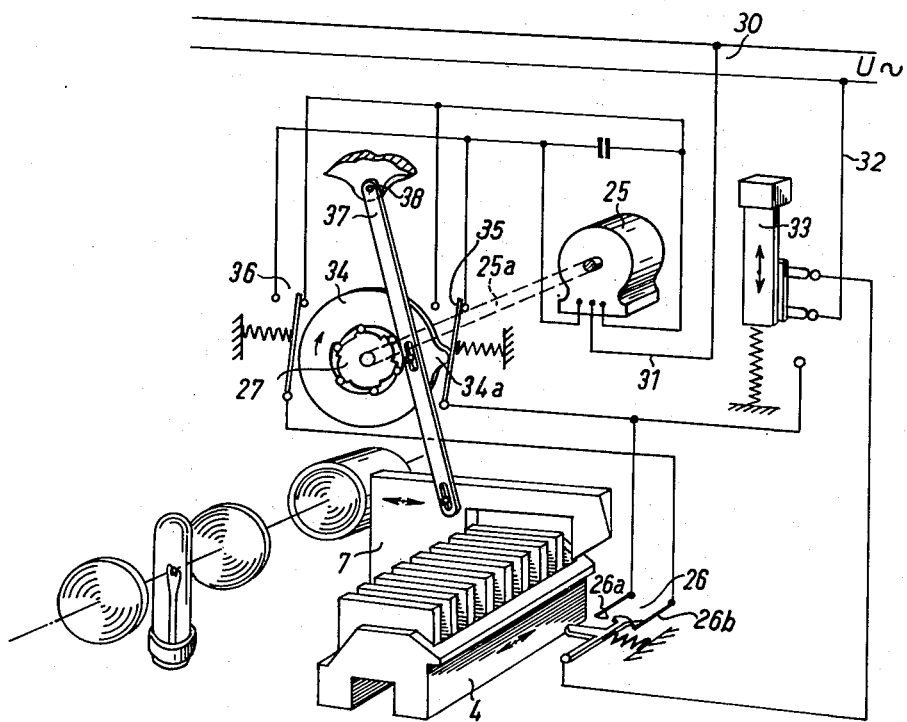
FIGURE 8 is a schematic diagram showing the electrical connections and pertinent components of the slide changing mechanism for use with a reversible electric driving motor.

With particular reference to FIGURE 1 there is shown a slide projector 1 comprising a guideway 2 which extends throughout the entire length of the slide projector. The guideway accommodates slides 3 which are inserted in a magazine 4 which, in turn, is introduced into the guideway. The guideway 2 has a ramp 2a which raises the slides vertically within the slide magazine. At the maximum height of the ramp 2a is an arm 5 which extends laterally from the casing 6 of the slide projector and supports the components of the slide changing mechanism.

The slide changing mechanism essentially comprises a slider 7 which has spaced, downwardly extending arms 8 and 9 (as may be seen in FIGURE 3) and a rack 10 which engages a gear 11 which is mounted on a shaft having an adjusting knob 12 at the end thereof.

The slider is positioned in the plane of the ramp and the projecting position of the slide and moves back and forth during operation through an opening 13 located in the side wall of the casing 6 and shown in FIGURE 2.

A shaft 14 extends laterally from a portion of the arm 5 and has a locking lever 15 pivotally mounted thereon. The locking lever has essentially a channel shape so as to have two bearing surfaces 16a and 16b.

These bearing surfaces are so formed that the lever 15 is pivitably in two vertical planes. A spring 17 interconnects the locking lever 15 and the projector casing so as to urge the lever into the position as shown in FIGURES 4 and 5.

The locking lever comprises a lever arm 18 which has a lateral portion 19 extending through an opening 20 into the guideway 2, as may be seen in FIGURE 3. In this position the locking member is engageable by the front surface 4a of the slide magazine. The pivotal movement of the locking lever in the direction of the arrow A as shown in FIGURE 2 is limited by the stop or abutment 21a in the opening 20 which engages the locking member 19 and in the opposite direction by the stop 21b which engages the control arm 22. The control arm 22 is positioned in the effective range of the slide changer arm 8.

The driving components of the slide changer are drivingly interconnected with a gear wheel 23 which meshes with a rack 24 fixed on the bottom edges of the slide magazine. This interconnecting structure is not shown in the drawings for purposes of clarity. When the magazine has reached its initial position whereby the first slide can be engaged by the slide changing mechanism the gear 23 will engage the rack 24. Changing of the slide will cause the interconnecting mechanism to feed the magazine forward to present the next succeeding slide for engagement by the slide changing mechanism.

A moveable contact arm 26 is located beneath the locking lever 15 which, as may be seen in FIGURE 8, is moveable between two stationary contacts 26a and 26b. In the arrangement of FIGURE 8 the driving motor is reversible but it is possible to use a uni-directional driving motor. In this modification as may be seen in FIGURE 9 the switch 28 which here takes the place of switch 26 of FIGURE 8 in combination with switch 45 merely functions as circuit breaker. A flat spring 29 has one end fixedly mounted on the casing and is actuated by the magazine 4 so as to operate moveable contact arm 26.

Proceeding next to FIGURE 8 the circuit which is connected to the switch 26 essentially comprises a source of electrical energy 30 which is connected through a supply line 31 to an electric motor 25. A second connection 32 is provided between voltage source 30 and a reversing switch 33 which functions as the control key for controlling the movement of the slide changers. Further electrical connections and switches are provided to connect the several terminals of the motor 25 for reversible operation.

The motor 25 has a driving shaft 25a which is connected to a one-way coupling 27 to a cam disk 34. Accordingly, the cam disk is rotatable only in a clockwise direction as viewed in FIGURE 8. The cam disk 34 has a cam 34a which cooperates with reversing switches 35 and 36. In addition, the cam disk 34 is drivingly connected to a lever 37 which is pivotally mounted on one end at 38. The other end of the lever 37 is connected to the slide 7 to actuate the slide changing mechanism.

Figure 9:
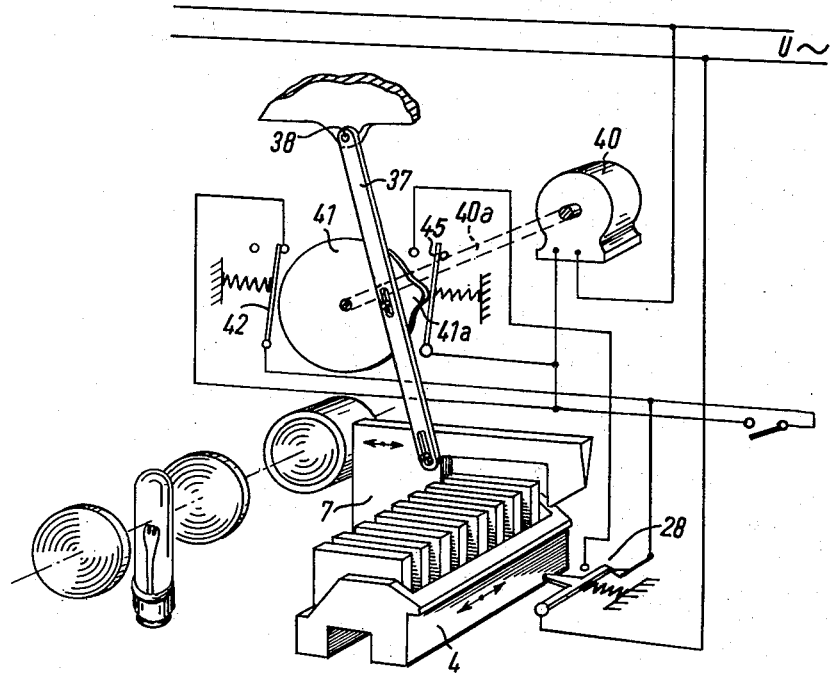
FIGURE 9 is a schematic view showing the electrical circuit connections and pertinent components of the slide projector when a uni-directional electric driving motor is used.

In FIGURE 9 there is illustrated a corresponding arrangement wherein the projector is provided with an electric motor 40 which is uni-directional. In this arrangement the drive shaft 40a of the motor is directly connected to a cam disk 41 which has a cam 41a which, in turn, cooperates with switches 42 and 45. A moveable contact arm 28 is actuated by the slide magazine 4 and functions solely as a circuit breaker.

With the structure of the invention in mind the operation of this mechanism will next be described.

The slide magazine 4 is introduced into the guideway 2 of the slide projector when the slider 7 is in its outer position as illustrated in FIGURE 6 of the drawings. In this position the slider 7 is able to receive the magazine containing the slides. Introduction of the slide magazine will cause the forward wall 4a of the magazine to engage the locking member 19, whereby this locking member is pivoted against the abutment 21a. When the locking lever is in this position the magazine has reached its initial position whereby the first slide is able to be engaged by the slide changing mechanism. The slide magazine is stopped from further movement along the guideway by the locking lever 19.

The foregoing pivoting movement of the locking lever 15 causes the control arm 22 to engage the arm 8 of the slider 7 as may be seen in FIGURE 2. When the slider 7 is actuated, arm 8 engages the slide 3 to place the slide into its projecting position. In the first stages of the movement of the slider 7 the arm 8 carries control arm 22 so as to pivot the locking lever 15 in the plane indicated by the arrow B in FIGURE 3. This will disengage the locking member 19 from the front wall 4a of the slide magazine. Upon disengagement of the locking member the spring 17 will pivot the locking lever 15 to the position shown in FIGURE 5 wherein the locking member 19 will engage the side wall of the slide magazine. The continued movement of the slider 7 has caused the control arm 22 to become disengaged therein and the control arm 22 will be in the position as also shown in FIGURE 5.

The locking lever 15 will remain in the position as shown in FIGURE 5 throughout the subsequent changes of the slides by the slide changing mechanism. It can be seen that these changes of the slides will not be impeded by the control arm 22 since this arm is out of the path of movement of the slides 3 as shown in FIGURE 5.

After the magazine has passed the locking lever 15 and the locking member 19 is disengaged from the side wall of the slide magazine the locking lever 15 will return to its original locking position under the action of the spring 17. As can be seen in FIGURE 4 the spring 17 is so mounted as to urge movement of the locking lever 15 in two vertical planes.

Proceeding next to FIGURE 8 the components are shown in position at that time when the slide magazine 4 is introduced to its initial position as determined by the locking member 19. At this time the reversing switch 26 is actuated by the magazine 4 to cause the motor to rotate in a clockwise direction. Accordingly, the cam disk 34 will also rotate in clockwise direction and will move the slider 7 through the lever 37.

After the cam disk has rotated through an angle of 180° the reversing switch 36 will be actuated to reverse the motor into rotation in a counter-clockwise direction. Thus movement of the cam disk 34 and the slider 7 is stopped and the first slide is now in its projecting position.

Further slide changing operations are conducted by actuation of the switch 33. Actuation of this switch will reverse the motor 25 to clockwise rotation to cause the cam 34a to be released from the switch 36. This switch will return to its normal position which will also reverse the motor to a clockwise direction. The reversing switch 33 can again be released. Under the action of a pressing spring the switch 33 will be returned to its initial and normal position while the motor rotates in a clockwise direction.

After a complete rotation through 360° of the cam disk 34 the cam 34a will again actuate the reversing switch 36 to cause counter-clockwise rotation of the motor. During this complete rotation of the cam disk 34 the entire slide changing operation has been completed, namely the slide has been returned from its projecting position, the magazine has been pushed ahead so as to move the next slide into position and this next slide has been transported into the projecting position by the slide changing mechanism. Successive slide changing mechanism can occur selectively by actuation of the switch 33.

During all these slide changing procedures the switch 26 is maintained in the position as shown in FIGURE 8 by the slide magazine 4. The switch 26 will be released only after the last slide has been returned to the magazine and the end of the magazine has passed the switch 26. This will cause the motor to rotate in the counter-clockwise direction wherein the cam disk and the slider 7 are stationary with the slider being in the position shown in FIGURE 8 so as to be able to receive a new magazine.

In FIGURE 9 there is illustrated a somewhat simplified switching arrangement for automatically adjusting the slider 7 to its initial position wherein a uni-directional drive motor is used. The procedure as described in connection with the FIGURE 8 arrangement is analogous to the FIGURE 9 arrangement except that in FIGURE 9 the motor is stopped instead of being reversed in direction.

In FIGURE 9 two moveable contact arms 42 and 23 are arranged in series in the electrical supply line connected to the motor. The switch 28 is actuated by the slide magazine and the switch 42 is actuated by the cam disk 41 and the cam 41a.

When the magazine 4 is introduced the switch 28 is closed to start the motor 40 which continues to operate until the cam disk rotates through an angle of 180°. At this point the cam 41a will open the moveable contact 42. When the slide magazine has passed the switch 28 so that the switch 28 is disengaged from the wall of the slide magazine, the motor circuit will be opened, and the slider 7 will be stopped in its initial position as shown in FIGURE 9 for reception of a new slide magazine.

The switching means as illustrated in FIG. 8 and FIGURE 9 comprises the reversing switch 35 in FIGURE 8 and the reversing switch 45 in FIGURE 9. Both of which are provided for effecting the return of the slider 7 to its initial position in case the slider 7 has been displaced from it in a period when no magazine is inserted due to unskilled or rough handling of the projector as may occur during transportation.

If the slider 7 is not in its initial position for reception of a new magazine the cam 34 in FIGURE 8 will not actuate the reversing switch 35. Since no magazine is inserted the contact arm 26 at the same time abuts the contact 26a. Upon connecting the projector to a current source both switches 26 and 35 will therefore immediately cause the motor 25 to rotate in a clockwise direction. Accordingly the cam disk 34 will also rotate in clockwise direction and will move the slider 7 through the lever 37.

This rotation will go on until the cam 34a actuates the switch 35 which causes the motor 25 to rotate in counter-clockwise direction.

Thus the movement of the cam disk 34 and the slider 7 is stopped and the slider 7 is reset in its initial position for reception of a new magazine. It will be readily understood that the cam disk 34 always will be rotated until the cam 34a acutates the switch 35 no matter in what position the cam was when the rotation started. The slider 7 will thus be brought back to its initial position from whatever position it might have been displaced to.

In FIGURE 9 the arrangement of the switches 28 and 45 produces a result analogous to the result described in connection with the switches 26 and 35 of FIGURE 8 except that in FIGURE 9 the motor is stopped instead of being reversed in direction.

Thus it can be seen that the present invention provides an effective yet simple arrangement for initially positioning the slide magazine when it is introduced into the slide projector.

It will be understood that this invention is susceptible to modification in order to adapt it to different usages and conditions and, accordingly, it is desird to comprehend such modifications within this invention as may fall within the scope of the appended claims.

What I claim is:

1. In a slide projector, a body, means on said body defining a guideway, a slide magazine slidably mounted on said guideway, a reciprocally mounted slider on said body for cooperation with said slide magazine and movable between initial and projecting positions, a rotatable cam disc operatively connected to said slider to reciprocate said slider between said positions, means on said body for limiting the movement of said slide magazine when said magazine is introduced on said guideway, said slider releasing said limiting means when the initial slide is taken from said magazine to permit the continued movement of said magazine along said guideway, controllable means including an electric motor, drivingly connected to said cam disc for selectively driving and stopping said cam disc and slider; a source of electric energy; a first cam actuated normally open switch connected in series to said motor, said cam disc closing said first switch when said slider is in said projecting position; a second cam actuated normally closed switch connected in series to said motor, said second switch being open whenever said slider is in said initial position; a third switch for selectively connecting said motor to said source of electric energy through said first and second switches, said third switch positioned at said guideway so as to be controlled by said slide magazine, whereby said third switch connects said motor to said source of energy through said first switch as long as said magazine engages said movement limiting means, and said third switch connects said motor to said source of energy through said second switch when said magazine has passed thereby; and an operating switch connected for by-passing said first switch to connect said motor to said source of energy.

2. In a slide projector as claimed in claim 1 and said first and second switches being spaced on diametrically opposed sides of said rotatable cam disc at an angle of rotation of 180° of said cam disc.

References Cited in the file of this patent

UNITED STATES PATENTS

| 2,401,506 | Pechkranz | June 4, 1946 |
| 2,679,705 | Rainous | June 1, 1954 |
| 2,705,438 | Peto | Apr. 5, 1955 |
| 2,979,987 | Brumley et al. | Apr. 18, 1961 |

FOREIGN PATENTS

| 1,087,371 | Germany | Aug. 18, 1960 |